A. F. BATCHELDER.
RESILIENT WHEEL.
APPLICATION FILED JAN. 6, 1915.
1,192,731.
Patented July 25, 1916.
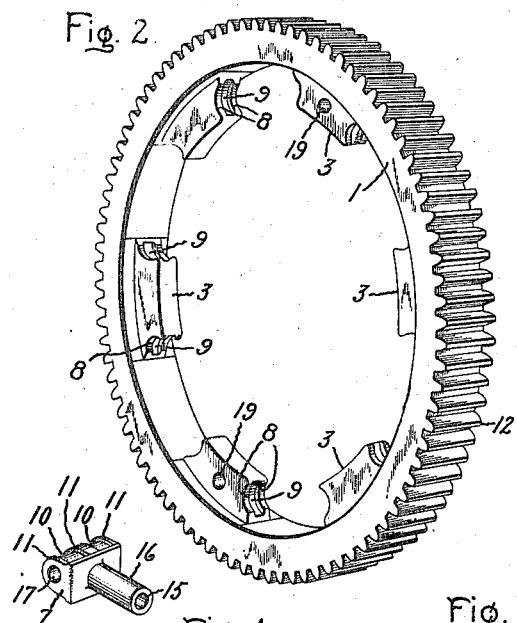
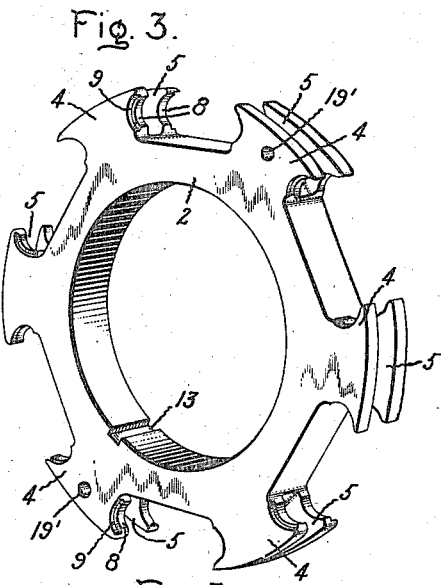
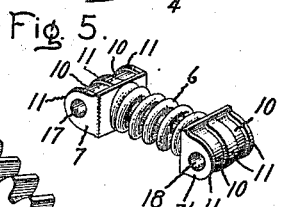
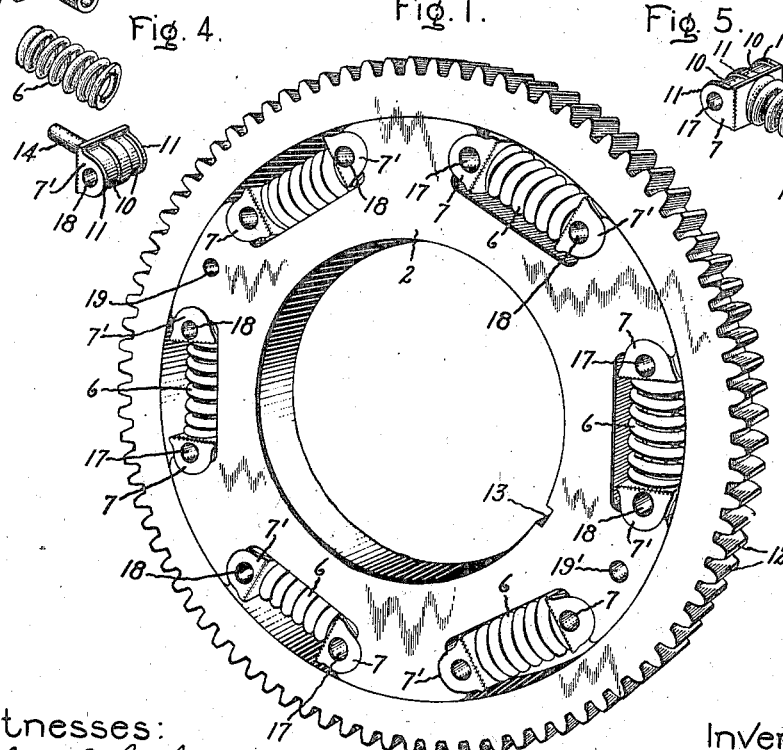
Witnesses:
Chas. B. Stokes
J. Ellis Glen.
Inventor:
Asa F. Batchelder,
by Allen G. S. Davis
His Attorney.

UNITED STATES PATENT OFFICE.

ASA F. BATCHELDER, OF SCHENECTADY, NEW YORK, ASSIGNOR TO GENERAL ELECTRIC COMPANY, A CORPORATION OF NEW YORK.

RESILIENT WHEEL.

1,192,731.   Specification of Letters Patent.   Patented July 25, 1916.

Application filed January 6, 1915.   Serial No. 723.

*To all whom it may concern:*

Be it known that I, ASA F. BATCHELDER, a citizen of the United States, residing at Schenectady, in the county of Schenectady, State of New York, have invented certain new and useful Improvements in Resilient Wheels, of which the following is a specification.

My invention relates to wheels of the type in which relatively rotatable rims and hubs are connected by cushioning devices to absorb shocks to which the rim or hub may be subjected.

It has for its object to provide a novel resilient wheel which is simple to manufacture, is durable, is easily assembled, and comprises a minimum number of parts.

The particular features of novelty which characterize my invention are pointed out in the claims annexed to and forming a part of this specification.

For a better understanding of my invention reference may be had to the following description taken in connection with the accompanying drawing, in which—

Figure 1 is a perspective view of a resilient wheel embodying my invention; Fig. 2 is a perspective view of the rim of the wheel of Fig. 1; Fig. 3 is a perspective view of the hub of the wheel of Fig. 1; Fig. 4 is a disassembled view of the spring parts of the wheel; and Fig. 5 is an assembled view of the spring parts shown in Fig. 4.

In the drawing, the resilient wheel is shown as a gear wheel which comprises two parts 1 and 2. Both parts have coöperating flanges 3 and 4, the flanges 4 being provided with annular grooves 5 into which fit the flanges 3. A plurality of tangentially disposed helical springs 6 provided with spring seats 7 and 7' are interposed between the flanges of the parts 1 and 2 for opposing relative motion between them. Either one or both sets of flanges are provided with tongues 8 and grooves 9 which engage coöperating grooves 10 and tongues 11 on the spring seats 7 and 7' for holding the springs against lateral displacement. I have shown the part 1 as the rim with teeth 12 on its outer periphery and the part 2 as the hub, provided with a key way 13 for fastening the hub to a shaft or axle (not shown).

The flanges 3 are of such width that they will enter between the flanges 4 from either side, and in assembling the wheel the rim is placed about the hub with the flanges 3 between the flanges 4 on the hub. They are then rotated relatively to one another, the flanges 3 entering the annular grooves 5 in the flanges 4. The flanges 3 and 4 are of the same width and they are rotated until they register. The springs 6 and spring seats 7 and 7' are assembled as shown in Fig. 5, the projecting rod 14 of the seat 7' entering the hole 15 in the projecting part 16 of the seat 7. A clamp is then placed in the holes 17 and 18 in the seats 7 and 7' and tightened up so as to compress the spring 6, whereupon the spring and spring seats are placed in position between the flanges on the parts 1 and 2 and the clamp released. Each of the springs 6 is thus placed in position, until all of them are in place as seen in Fig. 1.

By constructing a resilient wheel as above described it will be noted that the rim and hub may each be made of a single piece and that the springs are prevented from becoming displaced laterally without the use of plates bolted to the side of the wheel, or other additional parts. My wheel consequently is built up of a minimum number of parts. Furthermore the parts are accessible so that the spring seats may be easily oiled. The construction of the rim and hub, it will be noted, is such that all the wearing parts between them can be turned in a lathe. I have shown the rim and hub provided with holes 19 and 19' respectively which register and through which pins are inserted to center the rim on the hub, when the teeth 12 are cut thereon.

The seats 7 and 7' are semi-cylindrical in order to enable the springs to seat themselves when compressed, so that their center lines may remain straight and tangential when the gear is operating. These springs work under compression no matter in which direction the wheel is working, one set of the spring seats, as, for instance, the seats 7, being engaged by the flanges on one part of the gear wheel, and the other set of spring seats 7' being engaged by the flanges on the other part of the gear wheel. They are equally spaced about the wheel and their number and strength may be varied to suit the conditions of service for which the wheel is intended.

My invention is not limited to gear wheels, as it may without variation of structure or mode of operation be used with other classes of driving mechanisms, such as pulleys, armatures of dynamo electric machines, and the like.

What I claim as new and desire to secure by Letters Patent of the United States, is:—

1. A resilient wheel comprising two parts having coöperating flanges, the flanges on one part being provided with annular grooves, the flanges on the other part fitting in said annular grooves, a plurality of tangentially disposed helical springs and spring seats for said springs, said springs and seats being interposed between said flanges for opposing relative motion between said parts, said flanges on both of said parts being provided with means engaging said spring seats for holding said springs against lateral displacement.

2. A resilient wheel comprising two parts having coöperating flanges, the flanges on one part being provided with annular grooves, the flanges on the other part fitting in said annular grooves, a plurality of tangentially disposed helical springs and spring seats for said springs, said springs and seats being interposed between said flanges for opposing relative motion between said parts, said flanges on one of said parts and said spring seats being provided with coöperating tongues and grooves for holding said springs against lateral displacement.

3. A resilient wheel comprising two parts having coöperating flanges, the flanges on one part being provided with annular grooves, the flanges on the other part fitting in said annular grooves, a plurality of tangentially disposed helical springs and spring seats for said springs, said springs and seats being interposed between said flanges for opposing relative motion between said parts, said flanges on both of said parts and said spring seats being provided with coöperating tongues and grooves for holding said springs against lateral displacement.

4. A resilient wheel comprising two parts having coöperating flanges, the flanges on one part being provided with annular grooves, the flanges on the other part being of such width that they will enter between the first mentioned flanges from either side, said parts being relatively rotatable so that said last mentioned flanges enter the annular grooves in said first mentioned flanges and register therewith, a plurality of tangentially disposed helical springs and spring seats for said springs, said springs and seats being interposed between said flanges for opposing relative motion between said parts, said flanges on one of said parts being provided with means engaging said spring seats for holding said springs against lateral displacement.

5. A resilient wheel comprising two parts having coöperating flanges, the flanges on one part being provided with annular grooves, the flanges on the other part being of such width that they will enter between the first mentioned flanges from either side, said parts being relatively rotatable so that said last mentioned flanges enter the annular grooves in said first mentioned flanges and register therewith, a plurality of tangentially disposed helical springs and spring seats for said springs, said springs and seats being interposed between said flanges for opposing relative motion between said parts, said flanges on both of said parts being provided with means engaging said spring seats for holding said springs against lateral displacement.

6. A resilient wheel comprising two parts having coöperating flanges, the flanges on one part being provided with annular grooves, the flanges on the other part being of such width that they will enter between the first mentioned flanges from either side, said parts being relatively rotatable so that said last mentioned flanges enter the annular grooves in said first mentioned flanges and register therewith, a plurality of tangentially disposed helical springs and spring seats for said springs, said springs and seats being interposed between said flanges for opposing relative motion between said parts, said flanges on one of said parts and said spring seats being provided with coöperating tongues and grooves for holding said springs against lateral displacement.

7. A resilient wheel comprising two parts having coöperating flanges, the flanges on one part being provided with annular grooves, the flanges on the other part being of such width that they will enter between the first mentioned flanges from either side, said parts being relatively rotatable so that said last mentioned flanges enter the annular grooves in said first mentioned flanges and register therewith, a plurality of tangentially disposed helical springs and spring seats for said springs, said springs and seats being interposed between said flanges for opposing relative motion between said parts, said flanges on both of said parts and said spring seats being provided with coöperating tongues and grooves for holding said springs against lateral displacement.

In witness whereof, I have hereunto set my hand this 4th day of January, 1915.

ASA F. BATCHELDER.

Witnesses:
S. T. DODD,
BENJAMIN B. HULL.